(12) United States Patent
Zemskova (10) Patent No.: US 8,745,974 B2
(45) Date of Patent: Jun. 10, 2014

(54) EXHAUST SYSTEM

(75) Inventor: Svetlana Mikhailovna Zemskova, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 309 days.

(21) Appl. No.: 13/362,730

(22) Filed: Jan. 31, 2012

(65) Prior Publication Data
US 2013/0192203 A1 Aug. 1, 2013

(51) Int. Cl.
*F01N 3/10* (2006.01)
(52) U.S. Cl.
USPC ............... 60/303; 60/274; 60/295; 60/286
(58) Field of Classification Search
USPC .................................. 60/274, 303
See application file for complete search history.

(56) References Cited

U.S. PATENT DOCUMENTS

| | | | |
|---|---|---|---|
| 5,603,215 A | | 2/1997 | Sung et al. |
| 6,739,125 B1 | | 5/2004 | Mulligan |
| 6,928,806 B2 | | 8/2005 | Tennison et al. |
| 7,152,394 B2 | * | 12/2006 | Benz et al. ............... 60/286 |
| 7,235,217 B2 | * | 6/2007 | Nguyen ............... 422/198 |
| 7,386,977 B2 | * | 6/2008 | Ancimer et al. ........... 60/286 |
| 7,472,545 B2 | | 1/2009 | Hemingway et al. |
| 7,485,272 B2 | | 2/2009 | Driscoll et al. |
| 7,650,746 B2 | | 1/2010 | Hu et al. |
| 7,673,446 B2 | | 3/2010 | Zemskova et al. |
| 7,731,925 B2 | | 6/2010 | Gloeckle |
| 2006/0053776 A1 | * | 3/2006 | Ancimer et al. ........... 60/286 |
| 2006/0201139 A1 | | 9/2006 | Khadiya |
| 2007/0028601 A1 | | 2/2007 | Duvinage et al. |
| 2008/0168763 A1 | | 7/2008 | Ginter et al. |
| 2008/0184701 A1 | | 8/2008 | Katoh et al. |
| 2008/0236146 A1 | | 10/2008 | Ancimer et al. |
| 2009/0120075 A1 | | 5/2009 | Kato |
| 2009/0151341 A1 | | 6/2009 | Kim et al. |
| 2009/0260350 A1 | | 10/2009 | Bromberg et al. |

(Continued)

FOREIGN PATENT DOCUMENTS

| JP | 2005-530083 A | 10/2005 |
|---|---|---|
| JP | 2006-161672 A | 6/2006 |
| WO | WO 2010/094138 | 8/2010 |

OTHER PUBLICATIONS

Lindsay Brooke, http://www.sae.org/mags/tbe/7195, "NxtGen Moves Syngas Diesel-Aftertreatment Toward Production," Nov. 17, 2009, pp. 1-2.

(Continued)

*Primary Examiner* — Thomas Denion
*Assistant Examiner* — Jason Shanske
(74) *Attorney, Agent, or Firm* — Finnegan, Henderson, Farabow, Garrett & Dunner LLP (57) ABSTRACT

An exhaust system includes an exhaust passage configured to receive exhaust from a combustion engine, a heat exchanger disposed within the exhaust passage, and a reductant supply fluidly connected to the heat exchanger, the reductant supply including methane. The exhaust system also includes a first catalyst fluidly connected to the heat exchanger and configured to receive methane from the reductant supply via the heat exchanger. The exhaust system further includes a second catalyst disposed within the exhaust passage and configured to receive the exhaust from the combustion engine via the heat exchanger. The exhaust system also includes a clean-up catalyst disposed within the exhaust passage and configured to receive a combined flow. The combined flow includes the exhaust and the methane exiting the first catalyst.

20 Claims, 3 Drawing Sheets

(56) References Cited

U.S. PATENT DOCUMENTS

| | | | |
|---|---|---|---|
| 2009/0292030 A1* | 11/2009 | Casey et al. | 518/700 |
| 2010/0000202 A1 | 1/2010 | Fisher et al. | |
| 2010/0018476 A1 | 1/2010 | Zemskova et al. | |
| 2010/0077733 A1 | 4/2010 | Winkler et al. | |
| 2010/0146947 A1 | 6/2010 | Liu et al. | |
| 2010/0154390 A1 | 6/2010 | Tsujimoto | |
| 2010/0186390 A1 | 7/2010 | Perry et al. | |
| 2010/0247396 A1 | 9/2010 | Zuberi | |
| 2011/0047995 A1 | 3/2011 | Lewis et al. | |
| 2011/0167798 A1* | 7/2011 | Evans-Beauchamp | 60/274 |

OTHER PUBLICATIONS http://www.prnewswire.com/news-releates/nxtgen-emission-controls-releases-syngas-generator-evaluation-units-for-order-61856197.html, "NxtGen Emission Controls Releases Syngas Generator Evaluation Units for Order," Mar. 17, 2009, pp. 1-2.

Ted N. Tadrous et al., http://papers.sae.org/2010-01-0560, "Development of Passive/Active DPF System Utilizing Syngas Regeneration Strategy—Retrofit, Real Life Optimization and Performance Experience," Apr. 12, 2010, p. 1.

Erik Johannes et al., http://papers.sae.org/2008-01-0446, "Transient Performance of a Non-Catalytic Syngas Generator for Active DPF Regeneration and NOx Reduction," Apr. 14, 2008, p. 1.

H. Ale Ebrahim, "New Syngas Production Method Based on Noncatalytic Methane Reaction with Metal Oxides," Syngas: Production, Applications and Environmental Impact, 2011, Chapter 2, pp. 42.

M.A. Pen~A et al., http://www.sciencedirect.com/science/article/pii/0926860X96001081, "New Catalytic Routes for Syngas and Hydrogen Production," Sep. 2, 1996, pp. 1-2.

Ned Madden, http://www.prweb.com/releases/diesel/non-urea/prweb4676354.htm, "ACAT Global Introduces Non-Urea Syngas Commercial Diesel Retrofit Kits—To Meet Government Mandated Emissions Standards," Oct. 20, 2010, pp. 1-3.

M.A. Gondal et al.; "Photo-catalytic conversion of methane into methanol using visible laser," www.sciencedirect.com; Oct. 8, 2002, pp. 165-174.

Alessandra F. Lucrédio et al.; "Cobalt catalysts promoted with cerium and lanthanum applied to partial oxidation of methane reactions," Applied Catalysis B: Environmental 84, Oct. 10, 2007, pp. 106-111.

Qijian Zhang et al., "Comparatively high yield methanol production from gas phase partial oxidation of methane," Applied Catalysis A: General 223, May 29, 2001, pp. 201-207.

Shenglin Liu et al.; "Partial oxidation of methane and ethane to synthesis gas over a LiLaNiO/$\gamma$-Al$_2$)$_3$ catalyst," Applied Catalyst A: General 198, Oct. 23, 1999; pp. 261-266.

Kiyoshi Otsuka et al., "Direct conversion of methane into oxygenates," Applied Catalyst A: General 222, 2001, pp. 145-161.

T. Li et al., "Direct conversion of methane to methanol over nano-[Au/Si)$_2$] in [Mnim] C1 ionic liquid," Applied Catalyst A: General 398, Mar. 28, 2011, pp. 150-154.

Jan Sentek et al., "Plasma-catalytic methane conversion with carbon dioxide in dielectric barrier discharges," Applied Catalyst B: Environmental 94, Oct. 16, 2009, pp. 19-26.

Robert Raja, "Direct conversion of methane to methanol," Applied Catalysis A: General 158, Feb. 26, 1997; pp. L7-L15.

Y.-H. Chin et al., "NO reduction by $CH_4$ in the presence of excess $O_2$ over Pd/sulfated zirconia catalyst," Catalysis Today 54, 1999, pp. 419-429.

J.A. Z. Pieterse et al., "Durability of ZSM5-supported Co—Pd catalysts in the reduction of $NO_x$ with methane," Applied Catalysis B: Environmental 39, 2002, pp. 167-179.

Chang-jun Liu et al., "Comparative investigations on plasma catalytic methane conversion to higher hydrocarbons over zeolites," Applied Catalysis A: General 178, 1999, pp. 17-27.

Beata Michalkiewicz, "Partial oxidation of methane to formaldehyde and methanol using molecular oxygen over Fe-ZSM-5," Applied Catalysis A: General 277, pp. 147-153.

Hirofumi Ohtsuka et al., "Palladium -platinum-loaded sulfated zirconia: a highly durable catalyst for the reduction of nitrogen oxides by methane in the presence of water vapor and $SO_x$," Applied Catalysis B: Environmental 28, 2000, pp. L73-L76.

Rui Marques et al., "Selective reduction of $NO_x$ by hydrogen and methan in natural gas stationary sources over alumina-supported Pd, Co and Co/Pd catalysts Part A. On the effect of palladium precursors and catalyst pre-treatment," Catalysis Today 137, 2008, pp. 179-184.

John N. Armor, "The multiple roles for catalysis in the production of $H_2$," Applied Catalysis A: General 176, 1999, pp. 159-176.

J. N. Armor, "Catalytic reduction of nitrogen oxides with methane in the presence of excess oxygen: a review," Catalysis Today 26, 1995, pp. 147-158.

J.C. Martin et al., Pd/$\gamma$-Al$_2$O$_3$ monolithic catalyst for $NO_x$ reduction with $CH_4$ in excess of $O_2$: Effect of precursor salt, Chemical Engineering Journal 150, 2009, pp. 8-14.

Chang Hwan Kim et al., "Strontium-Doped Perovskites Rival Platinum Catalysts for Treating $NO_x$ in Simulated Diesel Exhaust," www.sciencemag.org., Mar. 26, 2010, vol. 327, pp. 1624-1627.

S. S. Bharadwaj et al., "Catalytic partial oxidation of natural gas to syngas," Fuel Processing Technology 42, 1995, pp. 109-127.

* cited by examiner

EXHAUST SYSTEM

TECHNICAL FIELD

The present disclosure is directed to an exhaust system and, more particularly, to an exhaust system capable of treating exhaust constituents including NOx.

BACKGROUND

Internal combustion engines, including diesel engines, gasoline engines, natural gas engines, and other engines known in the art, may emit exhaust containing a complex mixture of solid, liquid, and gaseous components. For example, the gaseous components of the exhaust may include compounds such as nitrous oxides ("NOx") and CO, and the solid and/or liquid components of the exhaust may include soluble organic fraction, soot, and/or unburned hydrocarbons. Together, the soluble organic fraction, soot, and unburned hydrocarbons emitted by internal combustion engines are generally referred to as "particulate matter."

The government regulates the exhaust released into the atmosphere from such engines based on the type, size, and/or class of engine. These exhaust regulations continue to become more stringent, and engine manufacturers typically use catalytic exhaust treatment systems to comply with these regulations. In such systems, a reductant, such as urea or ammonia, may be injected into the exhaust upstream of a selective catalytic reduction ("SCR") catalyst, and the catalyst materials within the SCR catalyst may reduce NOx carried by the exhaust in the presence of the reductant. In addition, a particulate filter may capture a portion of the particulate matter carried by the exhaust.

The effectiveness of an SCR catalyst is based on its ability to convert NOx carried in the exhaust to $N_2$ and other gaseous species such as $O_2$ and $H_2O$. Maintaining the SCR catalyst within a desired temperature range and providing it with a flow of exhaust having a sufficient level of $NO_2$ are both factors that assist in maximizing the NOx conversion efficiency of the SCR catalyst. The exhaust leaving the engine, however, typically has a temperature well above the optimum temperature range of the SCR catalyst. Generally, such exhaust also has levels of $NO_2$ far below the range needed for optimum NOx reduction by the SCR catalyst. Thus, exhaust treatment systems often include an oxidation catalyst disposed upstream of the SCR catalyst to assist in oxidizing the relatively abundant NO present in the exhaust. Oxidizing the NO may increase the amount of $NO_2$ present in the exhaust entering the SCR catalyst, and may assist in maximizing the conversion of NOx by the SCR catalyst.

An exemplary exhaust treatment system for controlling the NOx and particulate matter emissions of an internal combustion engine is illustrated in U.S. Pat. No. 6,928,806 ("the '806 patent"). Specifically, the '806 patent discloses an oxidation catalyst, an SCR catalyst coupled downstream of an oxidation catalyst, and a particulate filter coupled downstream of the SCR catalyst. The disclosed oxidation catalyst increases the level of $NO_2$ entering the SCR catalyst, and the particulate filter removes particulates from the exhaust before the exhaust is released to the atmosphere.

Although the system disclosed in the '806 patent may assist in removing particulate matter and reducing the NOx content of the exhaust, the system of the '806 patent has several drawbacks. For example, due to the dynamic nature of the exhaust temperature and flow rate, it can be difficult to maintain operation of the SCR catalyst employed by the '806 patent within its optimal temperature and $NO_2$ levels. Moreover, the SCR catalyst and particulate filter employed by the '806 patent are large and difficult to remove or replace for servicing. The size of these components also makes it difficult to package the exhaust treatment system in, for example, the engine compartment of a vehicle or other machine where space is limited. In addition, such particulate filters require frequent on-vehicle regeneration using various heating devices. Such heating devices are difficult to use, and further increase the cost and complexity of the exhaust treatment system. Moreover, actively regenerating the particulate filter using such heating devices requires heating the exhaust to temperatures that can be harmful to the catalyst materials used in the oxidation and SCR catalysts.

The embodiments of the present disclosure are directed toward overcoming the deficiencies described above.

SUMMARY

In an exemplary embodiment of the present disclosure, an exhaust system includes an exhaust passage configured to receive exhaust from a combustion engine, a heat exchanger disposed within the exhaust passage, and a reductant supply fluidly connected to the heat exchanger, the reductant supply including methane. The exhaust system also includes a first catalyst fluidly connected to the heat exchanger and configured to receive methane from the reductant supply via the heat exchanger. The exhaust system further includes a second catalyst disposed within the exhaust passage and configured to receive the exhaust from the combustion engine via the heat exchanger. The exhaust system also includes a clean-up catalyst disposed within the exhaust passage and configured to receive a combined flow. The combined flow includes the exhaust and the methane exiting the first catalyst.

In another exemplary embodiment of the present disclosure, an exhaust system includes a heat exchanger configured to reduce a temperature of exhaust received from a combustion engine to between approximately 250° C. and approximately 400° C. The exhaust system includes a first catalyst fluidly connected to the heat exchanger and configured to at least partially oxidize methane heated by the heat exchanger. The exhaust system further includes a second catalyst fluidly connected to the heat exchanger in parallel with the first catalyst, the second catalyst being configured to oxidize constituents of the exhaust. The exhaust system further includes a clean-up catalyst disposed downstream of the first and second catalysts. The clean-up catalyst is configured to reduce constituents of a combined flow. The combined flow includes the oxidized constituents of the exhaust and the at least partially oxidized methane.

In a further exemplary embodiment of the present disclosure, a method of treating exhaust from a combustion engine includes reducing a temperature of the exhaust to between approximately 250° C. and approximately 400° C., wherein the exhaust comprises at least approximately 500 ppm NOx. The method also includes converting at least 50 percent of NO in the exhaust to $NO_2$, at least partially oxidizing a mixture of methane and air, and reducing the $NO_2$ in the presence of the at least partially oxidized mixture.

DETAILED DESCRIPTION

Figure 1:
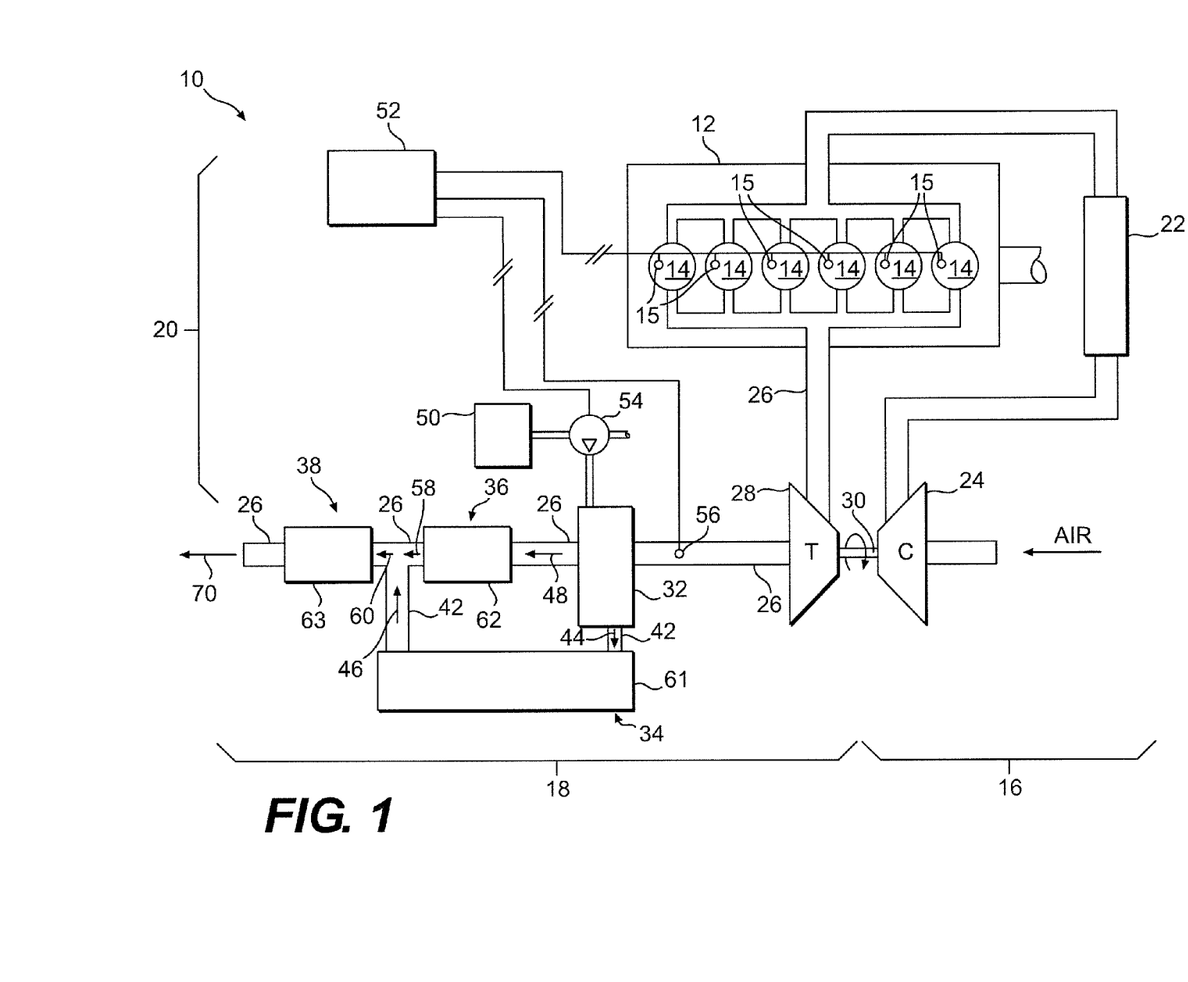
FIG. 1 is a schematic illustration of a power system according to an exemplary embodiment of the present disclosure.

FIG. 1 illustrates an exemplary power system 10. For the purposes of this disclosure, power system 10 is depicted and described as including a diesel-fueled internal combustion engine 12. However, it is contemplated that power system 10 may include any other type of combustion engine such as, for example, a gasoline engine or a gaseous fuel-powered engine burning compressed or liquefied natural gas, propane, or methane. Such combustion engines 12 may be connected and/or otherwise configured to supply power to any known vehicle or machine, whether stationary or mobile. For example, power system 10 may include an engine 12 that includes a plurality of combustion chambers 14 provided with fuel via a plurality of fuel injectors 15. It is contemplated that the engine 12 may include any number of combustion chambers 14, and that combustion chambers 14 may be disposed in an "in-line" configuration, a "V" configuration, or in any other conventional configuration.

Multiple separate sub-system may be included within power system 10. For example, power system 10 may include an air induction system 16, an exhaust system 18, and a control system 20. Air induction system 16 may be configured to direct air into combustion chambers 14 of engine 12 to mix with fuel from injectors 15 for subsequent combustion. Exhaust system 18 may exhaust by-products of the combustion to the atmosphere. Control system 20 may regulate operations of air induction and exhaust systems 16, 18 to reduce the production of regulated constituents and/or their discharge to the atmosphere.

Air induction system 16 may include multiple components that cooperate to condition and introduce compressed air into combustion chambers 14. For example, air induction system 16 may include an air cooler 22 located downstream of one or more compressors 24. Compressors 24 may be connected to pressurize inlet air directed through cooler 22. A throttle valve (not shown) may be located upstream and/or downstream of compressors 24 to selectively regulate (i.e., restrict) the flow of inlet air into power system 10. A restriction on the flow of inlet air may result in less air entering power system 10 and, thus, affect an air-to-fuel ratio of power system 10. It is contemplated that air induction system 16 may include different or additional components than described above such as, for example, variable valve actuators associated with each combustion chamber 14, filtering components, compressor bypass components, and other known components that may be selectively controlled to affect the air-to-fuel ratio of power system 10, if desired. It is further contemplated that compressors 24 and/or cooler 22 may be omitted, if a naturally aspirated engine 12 is employed.

Exhaust system 18 may include multiple components that treat and direct exhaust from the combustion chambers 14 to the atmosphere. For example, exhaust system 18 may include an exhaust passage 26, one or more turbines 28 driven by exhaust flowing through the exhaust passage 26, and a plurality of exhaust treatment devices fluidly connected to and/or otherwise disposed within the exhaust passage 26 at a location downstream of turbines 28. It is contemplated that exhaust system 18 may include different or additional components than described above such as, for example, exhaust gas recirculation (EGR) components, bypass components, an exhaust compression or restriction brake, an attenuation device, and other known components, if desired.

Each turbine 28 may be located to receive exhaust discharged from combustion chambers 14, and may be connected to one or more compressors 24 of air induction system 16 by way of a common shaft 30 to form a turbocharger. As the hot exhaust exiting the engine 12 moves through turbine 28 and expands against vanes (not shown) thereof, turbine 28 may rotate and drive the connected compressor 24 to pressurize inlet air. In one embodiment, turbine 28 may be a variable geometry turbine (VGT) or include a combination of variable and fixed geometry turbines. VGTs are a type of turbocharger having geometry adjustable to attain different aspect ratios, such that adequate boost pressure may be supplied to combustion chambers 14 under a range of operational conditions. As a flow area of turbine 28 changes, the air-to-fuel ratio and thus the performance of power system 10 may also change. Alternatively, a fixed geometry turbocharger with or without an electronically controlled wastegate may be included, if desired.

The treatment devices of exhaust system 18 may receive exhaust from turbine 28 and may catalytically oxidize, catalytically reduce, and/or otherwise convert constituents of the exhaust. In addition, the treatment devices of the exhaust system 18 may increase or decrease a temperature of the exhaust as desired. In further exemplary embodiments, the treatment devices of the exhaust system 18 may filter, capture, and/or otherwise remove constituents of the exhaust. In one example, the exhaust treatment devices may include a heat exchanger 32, a pair of oxidation catalysts 34, 36, and a clean-up catalyst 38. The exhaust treatment devices may also include a reductant supply 50 fluidly connected to the heat exchanger 32, and a pressurizing device 54 fluidly connected to the reductant supply 50. The pressurizing device 54 may also be fluidly connected to the heat exchanger 32, and may be disposed between the heat exchanger 32 and the reductant supply 50.

Although not illustrated in FIG. 1, in exemplary embodiments the exhaust treatment devices may further include a particulate filter consisting of a wire mesh, a ceramic honeycomb, and/or other like medium designed to trap particulate matter. As exhaust laden with particulate matter passes through the particulate filter, the particulate matter may be blocked by the medium and removed from the exhaust. Alternatively, in the exemplary embodiments shown in FIGS. 1-3, such a particulate filter may be omitted to reduce the size, cost, and complexity of the exhaust system 18.

The reductant supply 50 may comprise a tank or other like container configured to retain reductant in liquid or gaseous form. The reductant supply 50 may be configured to selectively advance a gaseous or liquid reductant, most commonly methane, urea, a water/urea mixture, alcohol, hydrogen, or an ammonia/urea mixture to the heat exchanger 32. For example, such reductants and/or mixtures may be stored within the reductant supply 50 under pressure, and may be selectively released to the heat exchanger 32 through appropriate valving, restrictions, passages, and/or other known flow control devices. Alternatively, the pressurizing device 54 may be fluidly connected to the reductant supply 50 and the heat exchanger 32 to assist in providing pressurized reductant to the heat exchanger 32. In an exemplary embodiment, the pressurizing device 54 may comprise a pump, a mixer, and/or other known pressurizing and/or fluid mixing apparatus. The pressurizing device 54 may be regulated and/or otherwise controlled to provide a desired mixture of reductant and air to the heat exchanger 32, and the pressurizing device 54 may be operable to responsively control the ratio of air and reductant in the mixture. For example, the pressurizing device 54 may be controlled to direct a pressurized mixture of methane and air to the heat exchanger 32, and the ratio of air to methane in the mixture may be responsively and/or otherwise controllably varied by the pressurizing device 54.

The heat exchanger 32 may comprise any type of fluid temperature regulation and/or heat transfer device known in the art. For example, the heat exchanger 32 may comprise any known parallel-flow or a cross-flow heat exchanger configured to decrease a temperature of the exhaust received via the exhaust passage 26, and/or to increase a temperature of the reductant or the mixture of air and reductant received from the pressurizing device 54 and/or the reductant supply 50. In exemplary embodiments, the heat exchanger 32 may be sized, located, and/or otherwise configured to reduce a temperature of the exhaust to between approximately 250° C. and approximately 400° C. upstream of the oxidation catalyst 36. The heat exchanger 32 may comprise, for example, a shell and tube, plate, plate-fin, adiabatic wheel, and/or any other type of heat exchanger so as to maximize the transfer of heat between the fluids passing through the heat exchanger 32 without mixing the fluids.

The first oxidation catalyst 34 of the exhaust system 18 may be located between the heat exchanger 32 and the clean-up catalyst 38. The second oxidation catalyst 36 may be fluidly connected downstream of the heat exchanger 32 in parallel with the first oxidation catalyst 34. The oxidation catalysts 34, 36 may contain catalyst materials useful in collecting, absorbing, adsorbing, and/or converting hydrocarbons, carbon monoxide, methane, and/or oxides of nitrogen contained in a flow. Such catalyst materials typically include one or more precious metals such as, for example, aluminum, platinum, palladium, rhodium, barium, cerium, alkali metals, alkaline-earth metals, rare-earth metals, or combinations thereof. The catalyst materials may be situated within the oxidation catalysts 34, 36 so as to maximize the surface area available for the collection and/or conversion of exhaust and/or reductant constituents. The oxidation catalysts 34, 36 may include, for example, respective substrates 40, 64, 68 (FIGS. 2 and 3) made from ceramics, metallic mesh, foam, or any other porous material known in the art, and the catalyst materials may be located on, for example, the substrates 40, 64, 68 of the oxidation catalysts 34, 36. The oxidation catalysts 34, 36 may be substantially similar or, alternatively, the separate oxidation catalysts 34, 36 may include different catalyst materials, or may have different shapes, sizes, capacities, flow patterns, and/or other configurations such that the respective oxidation catalysts 34, 36 may be optimized for the conversion of different fluids within the exhaust system 18.

The oxidation catalyst 34 may, for example, be configured to oxidize a reductant downstream of the heat exchanger 32. In exemplary embodiments, the oxidation catalyst 34 may be fluidly connected to the heat exchanger 32 and/or the exhaust passage 26 via a passage 42. The oxidation catalyst 34 may be configured to assist in at least partially oxidizing methane and/or a mixture of methane and air directed to the oxidation catalyst 34 via the heat exchanger 34. In exemplary embodiments, a temperature of the fluid provided to the oxidation catalyst 34 via the heat exchanger 32 may be increased due to a net transfer of heat to the fluid via the exhaust simultaneously passing through the heat exchanger 32. In exemplary embodiments, the oxidation catalyst 34 may be configured to maximize the amount of methane oxidized upstream of the clean-up catalyst 38, and any of the catalyst materials described above may be employed to facilitate the oxidation of methane. In exemplary embodiments, such materials may additionally include any known platinum-group metals, spinels, perovskites, zeolites, metal oxides, hydroxides, and/or mixtures thereof Such materials may be loaded onto a substrate 40 made from, for example, aluminas, silicas, TiOx, sulfated ceria, zirconia, yttria, WOx, VOx, and/or other solid superacids known in the art. Such exemplary partial methane oxidation reactions may produce, among other things, CO, $H_2$, $N_2$, and $CO_2$. For example, the oxidation catalyst 36 may partially oxidize the mixture of methane and air to produce approximately 28% to approximately 30% CO, approximately 20% to approximately 25% $H_2$, approximately 0.1% to approximately 0.5% $CO_2$, and a remainder of $N_2$. The partial oxidation of the mixture of methane and air may be an endothermic reaction, and this reaction may be aided by the addition of heat transferred to the mixture via the heat exchanger 32 as described above.

Figure 4:
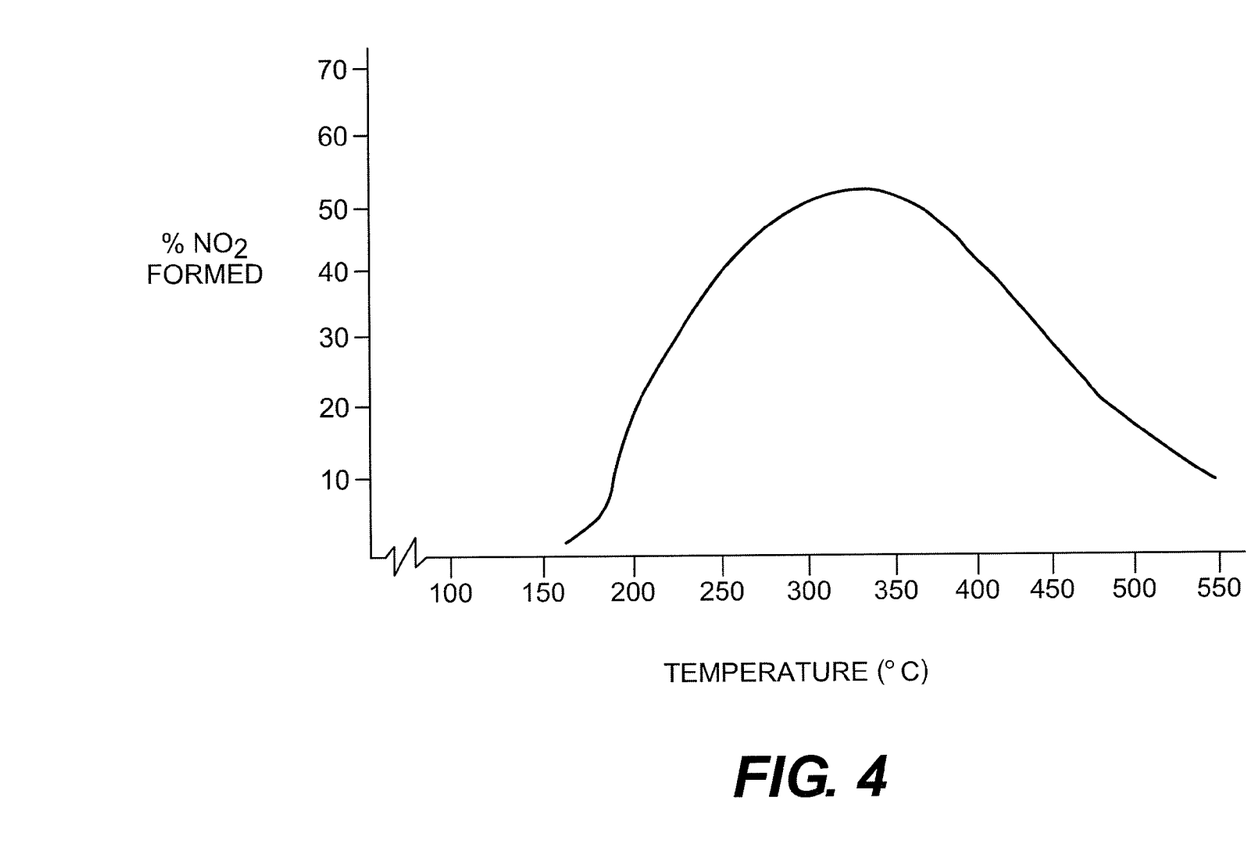
FIG. 4 is a graph illustrating an exemplary relationship between exhaust temperature and percent of $NO_2$ formed by an oxidation catalyst.

The oxidation catalyst 36 may, on the other hand, assist in oxidizing one or more components of the exhaust downstream of the heat exchanger 32 such as, for example, particulate matter, hydrocarbons, and/or CO. The oxidation catalyst 36 may also be configured to oxidize NO contained in the exhaust, thereby converting it to $NO_2$. Thus, the oxidation catalyst 36 may assist in achieving a desired ratio of NO to $NO_2$ upstream of the clean-up catalyst 38. In exemplary embodiments, the oxidation catalyst 36 may be configured to maximize the amount of NO converted to $NO_2$, and the catalyzed exhaust exiting the oxidation catalyst 36 may have a greater percentage of $NO_2$ than NO. Any of the catalyst materials described above with respect to the oxidation catalyst 34 may be employed by the oxidation catalyst 36 to facilitate the oxidation of NO to $NO_2$. In addition, any of these materials may be loaded onto a substrate 64 of the oxidation catalyst 36 made from, for example, aluminas, silicas, TiOx, sulfated ceria, zirconia, yttria, WOx, VOx, and/or other solid superacids known in the art. As illustrated by the graph shown in FIG. 4, the percentage of $NO_2$ formed by such catalyst materials may be maximized at exhaust temperatures between approximately 250° C. and approximately 400° C. In exemplary embodiments, the oxidation catalyst 36 may be configured to convert at least 40% of NO in the exhaust to $NO_2$, and in further exemplary embodiments, the oxidation catalyst 36 may be configured to convert at least 50% of NO in the exhaust to $NO_2$. In such exemplary embodiments, the engine 12 of the power system 10 may operate in a high-NOx, low particulate matter mode, and the exhaust passing through the oxidation catalyst 36 may include at least approximately 500 ppm NOx. Under such conditions, the heat exchanger 32 may cool the high-NOx exhaust to a temperature between approximately 250° C. and approximately 400° C. to facilitate conversion of at least 50% of NO in the exhaust to $NO_2$ by the oxidation catalyst 36.

As shown in FIG. 1, in exemplary embodiments, the oxidation catalyst 36 may be disposed in a housing 62 that is separate from and upstream of a housing 63 associated with the clean-up catalyst 38. In such exemplary embodiments, the at least partially oxidized mixture of methane and air exiting the oxidation catalyst 34 may mix and/or otherwise combine with the oxidized exhaust exiting the second catalyst 36 upstream of the clean-up catalyst 38 and/or downstream of the oxidation catalyst 36. In particular, by-products of the partial oxidation of the mixture of methane and air may exit the oxidation catalyst 34 through the passage 42, and may combine with the NO, $NO_2$, and other catalyzed exhaust constituents in the exhaust passage 26 downstream of the oxidation catalyst 36. This combined flow may then pass to the clean-up catalyst 38 via the exhaust passage 26.

Figure 2:
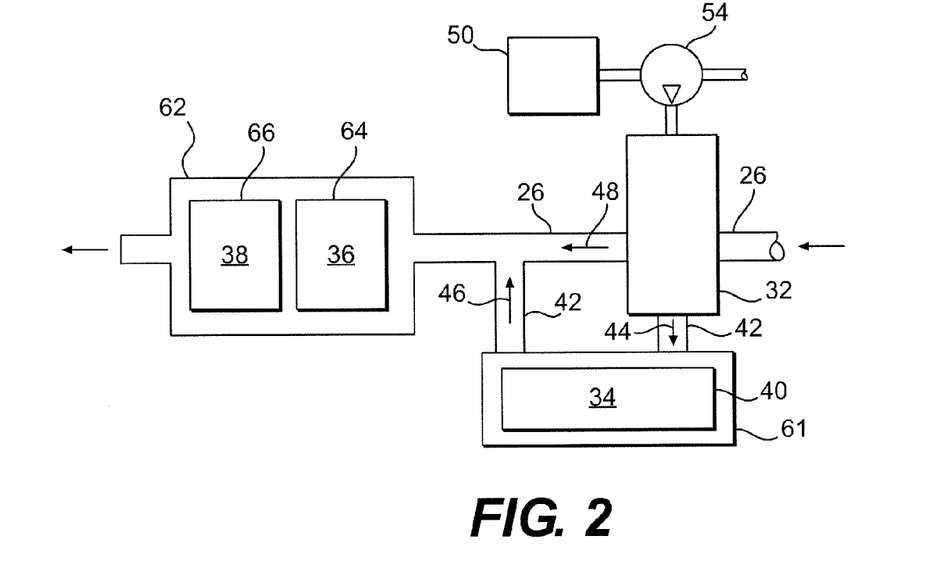
FIG. 2 is a schematic illustration of a portion of an exhaust system according to an exemplary embodiment of the present disclosure.
Figure 3:
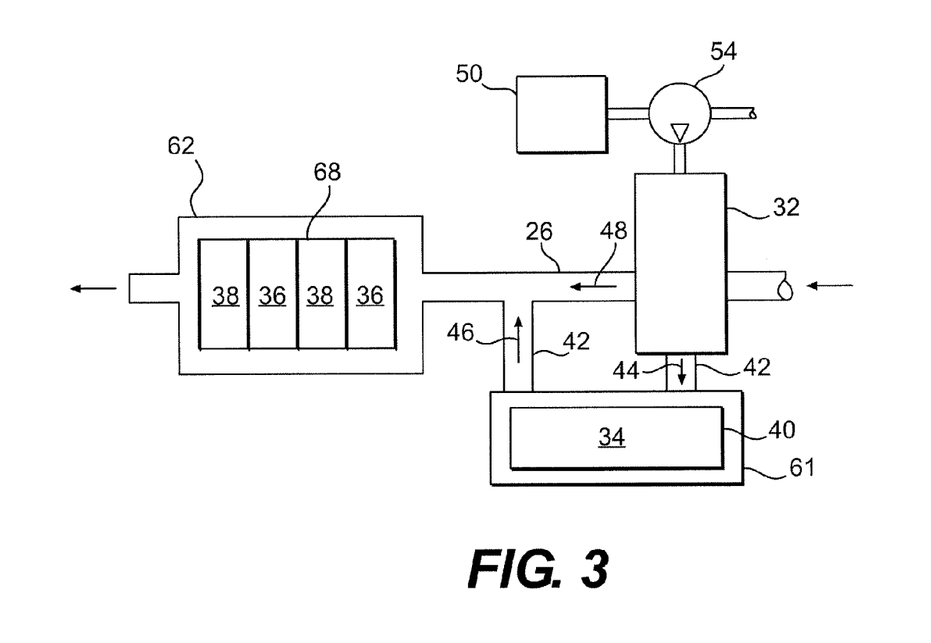
FIG. 3 is a schematic illustration of a portion of an exhaust system according to another exemplary embodiment of the present disclosure.

As shown in FIGS. 2 and 3, in additional exemplary embodiments, the oxidation catalyst 36 may be disposed within the same housing 62 as the clean-up catalyst 38. For example, the oxidation catalyst 36 may be disposed upstream of the clean-up catalyst 38 and downstream of the oxidation catalyst 34, such that the combined flow described above is formed upstream of the oxidation catalyst 36. As shown in FIG. 2, in such exemplary embodiments, the catalyst materials of the oxidation catalyst 36 may be disposed on a substrate 64 within the housing 62, and the catalyst materials of the clean-up catalyst 38 may be disposed on a separate respective substrate 66 within the housing 62. Alternatively, as shown in FIG. 3, catalyst materials of both catalysts 36, 38 may be disposed on a single substrate 68 within the housing 62. In such exemplary embodiments, the catalyst materials of the catalyst 36, 38 may be disposed on the substrate 68 in any convenient way. For example, the catalyst materials of each catalyst 36, 38 may be, for example, washcoated or sprayed onto the substrate 68, and the substrate 68 may be partially or completely coated with such materials. In exemplary embodiments, the catalyst materials of each catalyst 36, 38 may be disposed on the substrate 68 in separate adjacent bands or layers. Such an exemplary embodiment is illustrated in the partial schematic view of the substrate 68 shown in FIG. 3. Alternatively, the catalyst materials of the catalysts 36, 38 may be physically mixed together and disposed on the single substrate 68 as a substantially uniform coating.

The clean-up catalyst 38 may be disposed within the exhaust passage 26 and configured to receive the combined flow described above. For example, the clean-up catalyst 38 may be disposed downstream of the oxidation catalyst 34 and/or the oxidation catalyst 36, and the clean-up catalyst 38 may be configured to catalytically oxidize and/or catalytically reduce constituents of the combined flow described above. In exemplary embodiments, the clean-up catalyst 38 may comprise a redox catalyst configured to convert the combined flow to innocuous and/or environmentally acceptable elements such as $N_2$, $CO_2$, and $H_2O$, among other things. For example, the clean-up catalyst 38 may be configured to capture, store, and/or convert components of the combined flow consisting of unreacted constituents of the exhaust exiting the oxidation catalyst 36, as well as methane and/or other reductants that may slip past the oxidation catalyst 34. Such an exemplary clean-up catalyst 38 may comprise any of the catalyst materials, substrates, and/or substrate materials described above. Further, as used herein, the teen "oxidize" refers to a chemical reaction in which an element or a compound gains oxygen. Likewise, as used herein, the term "reduce" refers to a chemical reaction in which an element or a compound loses oxygen. Thus, it is understood that, during a "redox" reaction, both oxidation and reduction may occur at substantially the same time and/or over the same catalyst material/substrate. For example, in embodiments in which the clean-up catalyst 38 comprises a redox catalyst, the clean-up catalyst 38 may facilitate both oxidation and reduction of constituents of the combined flow over the clean-up catalyst substrate 66, 68. Such a redox reaction occurring in the clean-up catalyst 38 may convert the combined flow to $N_2$, $CO_2$, and $H_2O$, among other things.

It is understood that in some operating conditions, a quantity of NOx carried by the exhaust may not be converted to $NO_2$ by the oxidation catalyst 36. Such conditions may include, for example, when the oxidation catalyst 36 is above or below the optimum NOx conversion temperature range discussed above (between approximately 250° C. and approximately 400° C.), and/or when substantially all of the NOx conversion sites of the oxidation catalyst substrate 64/68 are occupied. In addition, methane in the mixture of methane and air that is not oxidized by the oxidation catalyst 34 may exit the oxidation catalyst 34 along with the by-products of the partial oxidation reaction occurring over the oxidation catalyst 34. The fluids exiting both catalysts 34, 36 may mix upstream of the clean-up catalyst 38, and the constituents of this combined flow may react over the clean-up catalyst 38 to form, among other things, $N_2$, $CO_2$, and $H_2O$.

The control system 20 may include components configured to regulate the treatment of exhaust from power system 10 prior to discharge to the atmosphere. Specifically, control system 20 may include a controller 52 in communication with one or more exhaust sensors 56, the pressurizing device 54, and the injectors 15. Based on input from the one or more exhaust sensors 56 and/or other inputs, the controller 52 may determine an amount of $NO_x$ being produced by power system 10, a desired amount of methane and/or other reductant that should be directed to the heat exchanger 32, a desired ratio of a mixture of methane and air directed to the heat exchanger 32, and/or other similar control parameters. The controller 52 may then regulate, for example, operation of the pressurizing device 54 such that the desired amount of methane and/or other reductants are passed to the oxidation catalyst 34. For example, the amount of methane and/or mixture of methane and air directed to the oxidation catalyst 34 may affect the amount of partially oxidized methane present in the combined flow. In exemplary embodiments, the exhaust sensor 56 may comprise a NOx, $O_2$, $CH_4$, CO, and/or $H_2$ sensor, or any other type of fluid sensor known in the art. For example, the exhaust sensor 56 may be disposed within the exhaust passage 26 and/or otherwise upstream of the oxidation catalyst 36, and the exhaust sensor 56 may be configured to generate a signal indicative of a NOx concentration of the exhaust. The controller 52 may be in communication with the exhaust sensor 56 and the pressurizing device 54, and the controller 52 may be configured to regulate operation of the pressurizing device 54 in response to the signal. Such regulation may control the amount of methane and/or the amount of the mixture of methane and air directed to the oxidation catalyst 34.

In a further exemplary embodiment, exhaust sensor 56 may be a temperature sensor configured to generate a signal corresponding to a temperature of the exhaust passing through the exhaust passage 26 upstream and/or downstream of the heat exchanger 32, and the exhaust sensor 56 may be configured to send this signal to controller 52. In this example, when the signal corresponds with an exhaust temperature above a threshold temperature, controller 52 may make a determination that it is likely that an oxide layer has formed on the substrate 64/68 of the oxidation catalyst 36. The controller 52 may determine that the oxidation catalyst 36 is in need of servicing based on such a signal, and may send a notification to an operator of the power system 10 indicating maintenance of the oxidation catalyst 36 is desired.

It is further contemplated that exhaust sensor 56 may alternatively embody a virtual sensor. A virtual sensor may produce a model-driven estimate based on one or more known or sensed operational parameters of power system 10, exhaust system 18, and/or the exhaust. For example, based on a known operating speed, load, temperature, boost pressure, ambient conditions (humidity, pressure, temperature), and/or other parameter of power system 10, a model may be referenced to determine the concentration of NOx in the exhaust. Similarly, based on a known or estimated NOx production of power system 10, a flow rate of exhaust exiting power system 10, and/or a temperature of the exhaust, the model may be referenced to determine the formation of the oxide layer. As a result, the signal directed from the exhaust sensor 56 to the controller 52 may be based on calculated and/or estimated values rather than direct measurements, if desired. It is contemplated that rather than a separate element, these virtual sensing functions may be accomplished by controller 52, if desired.

The controller 52 may embody a single or multiple microprocessors, field programmable gate arrays (FPGAs), digital signal processors (DSPs), etc. that include a means for controlling an operation of power system 10 in response to signals received from the various exhaust sensors 56 described above. Numerous commercially available microprocessors can be configured to perform the functions of the controller 52. It should be appreciated that the controller 52 could readily embody a microprocessor separate from that controlling other non-exhaust related power system functions, or that the controller 52 could be integral with a general power system microprocessor and be capable of controlling numerous power system functions and modes of operation. If separate from the general power system microprocessor, the controller 52 may communicate with the general power system microprocessor via datalinks or other methods. Various other known circuits may be associated with the controller 52, including power supply circuitry, signal-conditioning circuitry, actuator driver circuitry (i.e., circuitry powering solenoids, motors, or piezo actuators), communication circuitry, and other appropriate circuitry.

Industrial Applicability

The exhaust system 18 of the present disclosure may be used with any power system 10 emitting exhaust to the environment. Power systems 10 utilizing such an exhaust system 18 may be incorporated into machines used for mining, construction, mobile or stationary power generation, fanning, and/or other applications. Operation of the power system 10 and the exhaust system 18 will now be described.

Referring to FIG. 1, the air induction system 16 may pressurize and force air or a mixture of air and fuel into the combustion chambers 14 of the power system 10 for subsequent combustion. The fuel and air mixture may be combusted by the engine 12 of the power system 10 to produce a mechanical work output, and an exhaust of hot gases and particulate matter. For example, the exhaust may contain a complex mixture of air pollutants composed of gaseous material, which can include $NO_x$.

In order to substantially reduce and/or eliminate the particulate matter produced by the combustion process, the engine 12 of power system 10 may be operated in a "high-NOx" mode of operation. In such a high-NOx mode of operation, the engine 12 may be operated to combust a lean fuel-to-air mixture, the timing of injections by the injectors 15 into the respective combustion chambers 14 may be offset (either prior to or after passage of top-dead-center by a piston within each respective combustion chamber 14), a quantity of recirculated exhaust directed back to the engine 12 may be reduced, and/or other known engine control parameters may be modified. As a result of such high-NOx operation, the exhaust may comprise at least approximately 500 ppm NOx. In addition, due to the inverse relationship between the amount of NOx and particulate matter produced during the combustion of known fuels during such high-NOx operation, the amount of particulate matter in the exhaust may be negligible and/or within an environmentally acceptable range. Accordingly, a particulate filter may not be necessary to remove particulate matter from exhaust produced during high-NOx modes of operation, and as shown in FIG. 1, such a particulate filter may be omitted from the exhaust system 18.

As the exemplary high-NOx exhaust exits the combustion chambers 14, the exhaust may be directed through the turbine 28 to the heat exchanger 32 via the exhaust passage 26. The exhaust may pass proximate one or more exhaust sensors 56 disposed in the exhaust passage 26 upstream and/or downstream of the heat exchanger 32, and the one or more exhaust sensors 56 may generate signals indicative of characteristics of the exhaust. For example, an exhaust sensor 56 may generate a signal indicative of a NOx concentration of the exhaust upstream of the heat exchanger 32 and/or upstream of the oxidation catalyst 36. The exhaust sensor 56 may direct this signal to the controller 52 for processing and/or use in controlling components of the power system 10. For example, if the signal is indicative of a NOx concentration above a NOx concentration threshold, the controller 52 may regulate and/or control the pressurizing device 54 to increase an amount of methane or other reductant directed to the heat exchanger 32. On the other hand, if the signal is indicative of a NOx concentration below a NOx concentration threshold, the controller 52 may regulate and/or control the pressurizing device 54 to decrease an amount of methane directed to the heat exchanger 32.

The exhaust may pass through the heat exchanger 32 while a separate flow of methane, a mixture of methane and air, and/or other reductant or reductant mixture (collectively referred to for the duration of this disclosure as "methane" for ease of description) is simultaneously passed through the heat exchanger 32. As noted above, the amount, flow, and/or pressure of the methane directed to the heat exchanger from the reductant supply 50 may be varied and/or otherwise controlled by the controller 52. In particular, the controller 52 may regulate operation of the pressurizing device 54, in response to signals received from the one or more exhaust sensors 56, to control the amount of methane directed to the heat exchanger 32 in a closed-loop or an open-loop manner. As the relatively hot exhaust and relatively cool methane simultaneously pass through the heat exchanger 32, heat may be transferred from the exhaust to the methane, thereby actively cooling the exhaust to a temperature between approximately 250° C. and approximately 400° C. Such heat transfer may also increase the temperature of the methane. The cooled exhaust may pass from the heat exchanger 32 to the oxidation catalyst 36, in the direction of arrow 48, via the exhaust passage 26. The heated methane, on the other hand, may pass from the heat exchanger 32 to the oxidation catalyst 34, in the direction of arrow 44, via the passage 42.

Various constituents of the exhaust passing through the oxidation catalyst 36 may be oxidized by the catalyst materials disposed on the substrate 64 of the oxidation catalyst 36. In particular, the oxidation catalyst 36 may convert at least 40% of NO in the high-NOx exhaust to $NO_2$, and in exemplary embodiments, the oxidation catalyst 36 may convert at least 50% of NO in the exhaust to $NO_2$. As indicated by the graph in FIG. 4, the percentage of $NO_2$ formed by the oxidation catalyst 36 may be related to the temperature of the exhaust, and such $NO_2$ formation may be maximized when the temperature of the cooled exhaust is between approximately 250° C. and approximately 400° C. The exhaust may exit the oxidation catalyst 36 in the direction of arrow 58.

The heated methane passing through the oxidation catalyst 34 may be at least partially oxidized by the catalyst materials disposed on the substrate 40 of the oxidation catalyst 34. As methane is known to be a difficult molecule to oxidize, the endothermic reaction of methane over the catalyst materials of the oxidation catalyst 34 may only partially oxidize the methane passing through the oxidation catalyst 34. For example, only approximately 25% to approximately 40% of the methane passing through the oxidation catalyst 34 may be oxidized. As noted above, actively heating the methane with the heat exchanger 32 upstream of the oxidation catalyst 34 may increase the efficiency of this endothermic reaction. The by-products of the partial oxidation of methane may include $CO$, $H_2$, $N_2$, and $CO_2$, and these by-products may exit the oxidation catalyst 34 via the passage 42 in the direction of arrow 46.

As shown schematically in FIG. 1, such by-products may mix with the exhaust exiting the oxidation catalyst 36 to form a combined flow upstream of the clean-up catalyst 38, and the combined flow may enter the clean-up catalyst 38 in the direction of arrow 60. With respect to FIGS. 2 and 3, on the other hand, such by-products may mix with the exhaust upstream of the oxidation catalyst 36 and the clean-up catalyst 38. Thus, in such embodiments, the combined flow may be formed upstream of the oxidation catalyst 36, and may pass from the oxidation catalyst 36 to the clean-up catalyst 38 after oxidation of NO present in the combined flow by the oxidation catalyst 36.

With continued reference to FIG. 1, the combined flow containing $NO_2$-rich exhaust constituents and by-products of the partial methane oxidation reaction may be reacted over the clean-up catalyst 38. It is understood that the reactions taking place over the clean-up catalyst 38 may include both oxidation and reduction reactions of the various constituents of the combined flow. It is further understood that the by-products of the partial methane oxidation reaction may facilitate such oxidation and reduction reactions over the catalyst materials present on the substrate 66 of the clean-up catalyst 38. Such reactions may yield $N_2$, $CO_2$, and $H_2O$, among other things, and these by-products may exit the clean-up catalyst 38 via the exhaust passage 26 in the direction of arrow 70.

A variety of advantageous aspects may be associated with the disclosed power system 10, exhaust system 18, and/or methods of treating exhaust. For example, operating the engine 12 in a high-NOx mode may have the desirable effect of virtually eliminating the particulate matter produced during combustion and entrained within the engine exhaust. Thus, such high-NOx operation eliminates the need for a particulate filter and the active regeneration devices typically associated with such filters. As a result, the present exhaust system 18 may be more compact, less complicated to use and service, and less expensive than conventional exhaust systems employing particulate filter technologies.

Additionally, operating the engine in high-NOx mode is known to result in combustion exhaust having an elevated NOx concentration, such as approximately 500 ppm NOx or greater. While known oxidation and/or SCR catalysts may be sufficient to purify typical exhaust emissions containing between approximately 250 ppm and approximately 300 ppm NOx, such catalysts are not capable of purifying exhaust having such elevated NOx concentrations. The exhaust cooling, partial methane oxidation, and combined flow redox capabilities of the exhaust system 18, on the other hand, facilitate the safe and acceptable conversion of such high-NOx gases into innocuous constituents. In particular, cooling the high-NOx exhaust upstream of the oxidation catalyst 36 maximizes the $NO_2$ available for reaction in the clean-up catalyst 38. Additionally, partially oxidizing methane yields by-products facilitating substantially complete conversion of $NO_2$-rich exhaust over the clean-up catalyst 38. The substantially complete conversion of such exhaust is not possible with standard SCR technologies, even if methane is used as a reductant.

It will be apparent to those skilled in the art that various modifications and variations can be made to the system of the present disclosure without departing from the scope of the disclosure. For example, although not described in greater detail herein, in further exemplary embodiments a portion of the heated methane exiting the heat exchanger 32 may be directed to the air induction system 16 for input into the engine 12. Providing such heated methane to the engine 12 may, among other things, improve combustion efficiency in the respective combustion chambers 14. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An exhaust system, comprising:
   an exhaust passage configured to receive exhaust from a combustion engine;
   a heat exchanger disposed within the exhaust passage;
   a reductant supply fluidly connected to the heat exchanger, the reductant supply including methane;
   a first catalyst fluidly connected to the heat exchanger and configured to receive methane from the reductant supply via the heat exchanger;
   a second catalyst disposed within the exhaust passage and configured to receive the exhaust from the combustion engine via the heat exchanger; and
   a clean-up catalyst disposed within the exhaust passage and configured to receive a combined flow, the combined flow including the exhaust and the methane exiting the first catalyst.

2. The exhaust system of claim 1, wherein the first catalyst comprises an oxidation catalyst configured to at least partially oxidize the methane received from the reductant supply.

3. The exhaust system of claim 1, further comprising a pressurizing device fluidly connected to the reductant supply, the pressurizing device configured to direct a pressurized mixture of methane and air to the heat exchanger.

4. The exhaust system of claim 3, further comprising an exhaust sensor disposed in the exhaust passage upstream of the second catalyst, the exhaust sensor configured to generate a signal indicative of a NOx concentration of the exhaust, and
   a controller in communication with the sensor and the pressurizing device, the controller configured to regulate operation of the pressurizing device in response to the signal.

5. The exhaust system of claim 1, wherein the second catalyst comprises an oxidation catalyst configured to convert NO in the exhaust to $NO_2$.

6. The exhaust system of claim 1, wherein the clean-up catalyst comprises a redox catalyst configured to convert the combined flow to $N_2$, $CO_2$, and $H_2O$.

7. The exhaust system of claim 1, wherein the heat exchanger is configured to cool the exhaust to a temperature between approximately 250° C. and approximately 400° C.

8. The exhaust system of claim 1, wherein the exhaust comprises at least approximately 500 ppm NOx.

9. The exhaust system of claim 8, wherein the second catalyst is configured to convert at least 50 percent of NO in the exhaust to $NO_2$, and to direct the $NO_2$ to the clean-up catalyst.

10. The exhaust system of claim 9, wherein the clean-up catalyst is configured to reduce a portion of the $NO_2$ received from the second catalyst in the presence of partially oxidized methane received from the first catalyst.

11. The exhaust system of claim 1, wherein the second catalyst is disposed upstream of the clean-up catalyst and downstream of the first catalyst, such that the combined flow is formed upstream of the second catalyst.

12. The exhaust system of claim 11, wherein the second catalyst and the clean-up catalyst are disposed on a single substrate.

13. The exhaust system of claim 11, wherein the second catalyst and the clean-up catalyst are disposed in a single housing.

14. The exhaust system of claim 1, wherein the second catalyst and the clean-up catalyst are mixed together and disposed on a single substrate downstream of the first catalyst, such that the combined flow is formed upstream of the second catalyst and the clean-up catalyst.

15. The exhaust system of claim 1, wherein the second catalyst is disposed in a housing separate from and upstream of the clean-up catalyst such that the combined flow is formed downstream of the second catalyst.

16. An exhaust system, comprising:
a heat exchanger configured to reduce a temperature of exhaust received from a combustion engine to between approximately 250° C. and approximately 400° C.;
a first catalyst fluidly connected to the heat exchanger and configured to at least partially oxidize methane heated by the heat exchanger;
a second catalyst fluidly connected to the heat exchanger in parallel with the first catalyst, the second catalyst configured to oxidize constituents of the exhaust; and
a clean-up catalyst disposed downstream of the first and second catalysts, the clean-up catalyst configured to reduce constituents of a combined flow, the combined flow including the oxidized constituents of the exhaust and the at least partially oxidized methane.

17. The exhaust system of claim 16, further comprising a reductant supply fluidly connected to the heat exchanger, the reductant supply including methane, and
a pressurizing device fluidly connected to the reductant supply, the pressurizing device configured to direct a pressurized mixture of methane and air to the heat exchanger.

18. The exhaust system of claim 17, further comprising an exhaust sensor disposed upstream of the second catalyst, the exhaust sensor configured to generate a signal indicative of a NOx concentration of the exhaust, and
a controller in communication with the sensor and the pressurizing device, the controller configured to regulate operation of the pressurizing device in response to the signal.

19. A method of treating exhaust from a combustion engine, comprising:
reducing a temperature of the exhaust to between approximately 250° C. and approximately 400° C., wherein the exhaust comprises at least approximately 500 ppm NOx;
converting at least 50 percent of NO in the exhaust to $NO_2$;
at least partially oxidizing a mixture of methane and air; and
reducing the $NO_2$ in the presence of the at least partially oxidized mixture.

20. The method of claim 19, further comprising determining a NOx concentration of the exhaust, and regulating a ratio of air to methane in the mixture of methane and air based on the NOx concentration.

* * * * *